US012135245B2

(12) United States Patent
Herceg et al.

(10) Patent No.: US 12,135,245 B2
(45) Date of Patent: Nov. 5, 2024

(54) TEMPERATURE DETECTION

(71) Applicant: NOKIA TECHNOLOGIES OY, Espoo (FI)

(72) Inventors: Marijan Herceg, Osijek (HR); Tomislav Matic, Osijek (HR)

(73) Assignee: NOKIA TECHNOLOGIES OY, Espoo (FI)

( * ) Notice: Subject to any disclaimer, the term of this patent is extended or adjusted under 35 U.S.C. 154(b) by 93 days.

(21) Appl. No.: 17/434,874

(22) PCT Filed: Mar. 8, 2019

(86) PCT No.: PCT/EP2019/055922
§ 371 (c)(1),
(2) Date: Aug. 30, 2021

(87) PCT Pub. No.: WO2020/182282
PCT Pub. Date: Sep. 17, 2020

(65) Prior Publication Data
US 2022/0163401 A1     May 26, 2022

(51) Int. Cl.
*G01K 7/01*     (2006.01)
(52) U.S. Cl.
CPC ..................... *G01K 7/01* (2013.01)
(58) Field of Classification Search
CPC ....................................................... G01K 7/01
See application file for complete search history.

(56) References Cited

U.S. PATENT DOCUMENTS

| 7,965,476 B2 | 6/2011 | Mizuno | |
| 2009/0134333 A1* | 5/2009 | Ishibashi | H03F 3/08 |
| | | | 250/352 |
| 2012/0013364 A1* | 1/2012 | Schnaitter | G01K 7/01 |
| | | | 327/63 |
| 2013/0235903 A1 | 9/2013 | Wong et al. | |
| 2014/0269834 A1 | 9/2014 | Eberlein | |
| 2017/0023416 A1* | 1/2017 | Kim | G01K 7/01 |
| 2019/0086272 A1* | 3/2019 | Xia | G01K 7/02 |

FOREIGN PATENT DOCUMENTS

| BE | 774928 A | 3/1972 |
| CN | 1497248 A | 5/2004 |
| CN | 102124822 A | 7/2011 |

(Continued)

OTHER PUBLICATIONS

Translation of JP2003014547A (Year: 2003).*

(Continued)

*Primary Examiner* — Mirellys Jagan
(74) *Attorney, Agent, or Firm* — SQUIRE PATTON BOGGS (US) LLP

(57) ABSTRACT

A temperature detecting apparatus comprising: a first current reference for providing a first current to an intermediate node; and a second current reference for drawing a second current from the intermediate node; wherein at least one of the first current reference and the second current reference is temperature dependent; a resistor electrically connected to the intermediate node for enabling provision of a third current to the intermediate node or for drawing a third current from the intermediate node; and means for detecting the third current.

4 Claims, 5 Drawing Sheets

(56) References Cited

FOREIGN PATENT DOCUMENTS

| CN | 102577105 A | 7/2012 | | |
|---|---|---|---|---|
| CN | 202442810 U | 9/2012 | | |
| CN | 203399072 U | 1/2014 | | |
| CN | 104049669 A | 9/2014 | | |
| DE | 33 21 862 A1 | 12/1984 | | |
| EP | 0 409 214 A2 | 1/1991 | | |
| GB | 1 209 703 A | 10/1970 | | |
| GB | 2292221 A | * 2/1996 | ............ | G01K 3/005 |
| JP | H05-142039 A | 6/1993 | | |
| JP | 10-318849 A | 12/1998 | | |
| JP | 2003-014547 A | 1/2003 | | |

OTHER PUBLICATIONS

Translation of JPH05142039A (Year: 1993).*
International Search Report and Written Opinion dated Feb. 6, 2020 corresponding to International Patent Application No. PCT/EP2019/055922.
Communication pursuant to Article 94(3) EPC dated Dec. 22, 2023 corresponding to European Patent Application No. 19709935.1.
Chinese Office Action corresponding to CN Application No. 201980093724.6, dated Feb. 2, 2024.
Chinese Office Action, with machine English language translation, corresponding to CN Application No. 201980093724.6, dated Jul. 12, 2024.

* cited by examiner

TEMPERATURE DETECTION

TECHNOLOGICAL FIELD

Embodiments of the present disclosure relate to temperature detection. Some relate to detecting an absolute temperature and some relate to detecting a temperature difference.

BACKGROUND

It is desirable in many applications to detect electrically a temperature, for example, an absolute temperature at a point in space or a temperature difference between points in time and/or points in space.

BRIEF SUMMARY

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
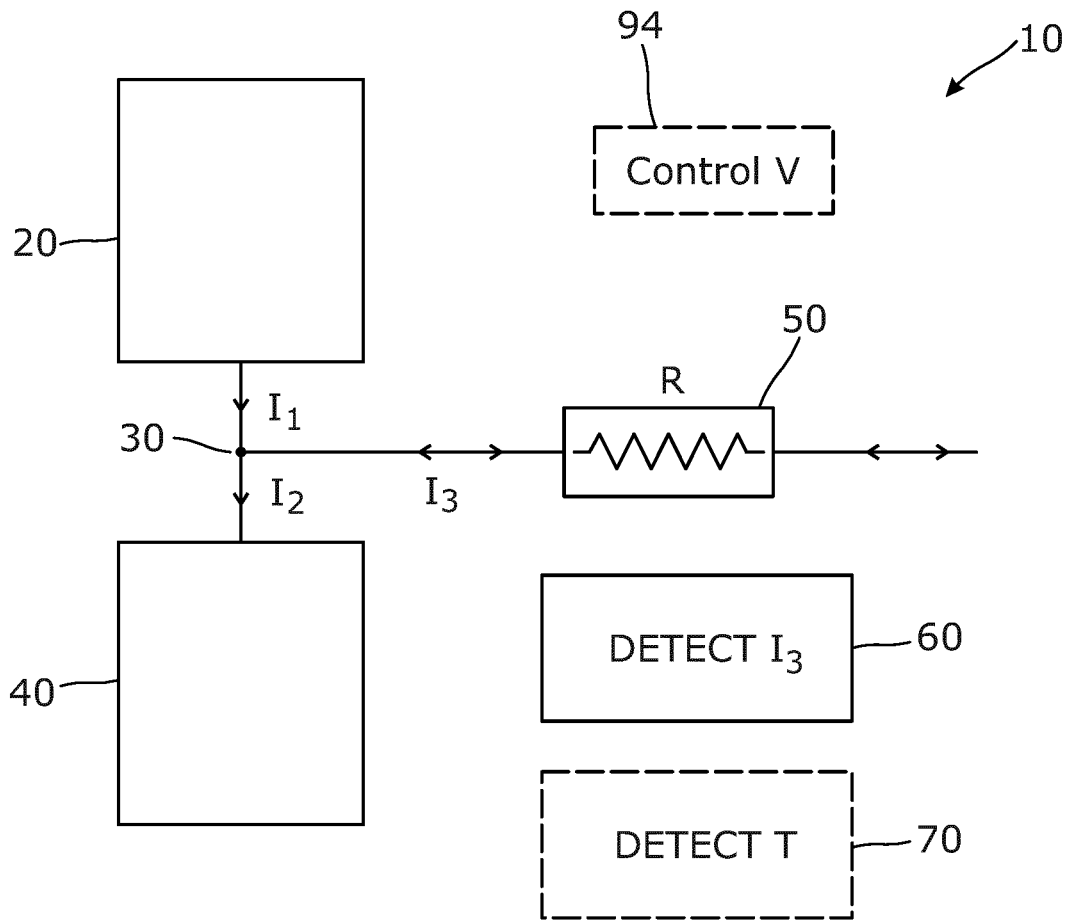
FIG. 1 shows an example embodiment of the subject matter described herein.

The FIGs illustrate a temperature detecting apparatus 10 comprising: a first current reference 20 for providing a first current $I_1$ to an intermediate node 30; and a second current reference 40 for drawing a second current $I_2$ from the intermediate node 30; wherein at least one of the first current reference 20 and the second current reference 30 is temperature dependent; a current path electrically connected to the intermediate node 30 for enabling provision of a third current $I_3$ to the intermediate node 30 or for drawing a third current $I_3$ from the intermediate node 30; and means 60 for detecting the third current $I_3$.

In some but not necessarily all examples the current path is a direct current path. In some but not necessarily all examples the current path comprises a resistor 50.

FIG. 1 illustrates an example of a temperature-detecting apparatus 10. The temperature-detecting apparatus 10 is configured to electrically detect a temperature. The detected temperature may be an absolute temperature at a point in space or a temperature difference between points in time and/or points in space.

In this example, the temperature-detecting apparatus 10 comprises a first current reference 20, a second current reference 40, a resistor 50 and a detector 60.

In this example, the first current reference 20, the second current reference 40, and the resistor 50 are electrically interconnected via an intermediate node 30.

The first current reference 20 is configured to provide a first electric current $I_1$ to the intermediate node 30 and the second current reference 40 is configured to draw a second electric current $I_2$ from the intermediate node 30. The resistor 50 is electrically connected to the intermediate node 30. The electrically connected resistor 50 enables provision of a third current $I_3$ to the intermediate node 30 or the drawing of a third current $I_3$ from the intermediate node 30.

As the only currents entering or leaving the intermediate node 30 are the first current $I_1$, the second current $I_2$ and the third current $I_3$ then according to Kirchhoff's current law the algebraic sum of these three currents is zero. Consequently, if there is a difference between the first current $I_1$ and the second current $I_2$ then there will be a third current $I_3$. Furthermore, as a difference between the first current $I_1$ and the second current $I_2$ changes, the third current $I_3$ will also change.

The detector 60 is configured to detect the third current $I_3$. In some but not necessarily all examples it may be configured to detect the presence of the third current $I_3$. In some but not necessarily all examples it may be configured to detect a polarity of the third current $I_3$. In some but not necessarily all examples it may be configured to measure the third current $I_3$ as a scalar or vector quantity.

At least one of the first current reference 20 and the second current reference 40 is temperature-dependent. As the temperature changes, one or both of the first current $I_1$ and the second current $I_2$ changes, changing the third current $I_3$ and this change in the third current $I_3$ is detected by the detector 60.

In some examples, only the first current reference 20 is configured to be temperature-dependent. In this example the temperate detecting apparatus 10 can be used to detect a temperature at the first current reference 20. The temperature detection can be a detection of an absolute temperature or a detection of a change in temperature depending on implementation.

In some examples, only the second current reference 40 is configured to be temperature-dependent. In this example the temperate detecting apparatus 10 can be used to detect a temperature at the second current reference 40. The temperature detection can be a detection of an absolute temperature or a detection of a change in temperature depending on implementation.

In some examples, the first current reference 20 is configured to be temperature-dependent and the second current reference 40 is configured to be temperature-dependent. In this example the temperate detecting apparatus 10 can be used to detect a temperature difference between the first current reference 20 and the second current reference 40.

It will be appreciated from the foregoing that the resistor 50 balances the electric current to/from the intermediate node 30 so that the algebraic sum of the current meeting at the node 30 is zero.

In some, but not necessarily all, examples, the apparatus 10 also comprises a temperature detector 70. The temperature detector 70 is coupled to the current detector 60 that detects the third current $I_3$. The temperature detector 70 is configured to convert detection of a third current $I_3$ to detection of a temperature. The temperature detector 70 can be configured to convert measurement of a third current $I_3$ to measurement of a temperature. As previously described, the temperature detected may be an absolute temperature or may be a temperature difference.

As previously described, one of the first current reference 20 and the second current reference 40 is temperature-dependent. It is also desirable for the current references 20, 40 to be substantially voltage-independent within an operational voltage range. As a consequence, the electric current of the temperature-dependent current reference varies with temperature but does not vary with the voltage. In the following examples, a diode configured for reverse bias is used as the current reference that is temperature-dependent. The reverse bias configured diode is operated in the reverse bias region, before avalanche.

A diode may be a semiconductor diode. A semiconductor diode has a semiconductor junction, with different majority carriers on either side of the junction. In a p-n semiconductor diode this is achieved by having p-type semiconductor and n-type semiconductor on either side of the junction. The diode can, for example, be a p-n junction diode, a Schottky barrier diode, a diode connected bipolar transistor.

The Shockley diode equation gives the current-voltage (I-V) characteristic of a theoretical diode when operated in either forward bias or reverse bias applied voltage:

$$I = I_s(\exp(V/V_T) - 1)$$

V is the voltage applied across the diode. It is positive for a forward bias and negative for a reverse bias. I is the electric current through the diode. $I_s$ is the reverse bias saturation current. $V_T$ is the thermal voltage defined as kT/q (the Boltzmann constant multiplied by temperature in Kelvin and divided by the electron charge).

To better represent an actual diode, the thermal voltage can be scaled by a factor that is increased from 1 (the ideal equation) to a value greater than 1.

Under reverse bias (also known as reverse polarity) the exponential term in the diode equation is near zero and the current is near a constant (negative) reverse current value of $-I_s$. The reverse saturation current, $I_s$, is not constant for a given device, but its magnitude increases with temperature.

It will be appreciated that as the temperature of the reverse bias configured diode changes, the saturation current changes changing the third current $I_3$. This change is detected by the detector 60. The change in the third current $I_3$ can, for example, be detected by detecting a voltage change across the resistor 50. However, it can also be determined in other ways. For example, it is possible to indirectly detect the third current $I_3$ by detecting both the first current $I_1$ and the second current $I_2$ and detecting a change in the difference between the first current $I_1$ and the second current $I_2$.

The detector 60 can be configured to detect one or more of an existence of the third current $I_3$, a polarity of the third current $I_3$, a magnitude of the third current $I_3$, or a change in any one of these parameters.

In some, but not necessarily all, examples, the resistor 50 may be configured as a variable resistor that has a resistance value that can be varied. The resistance of the resistor 50 may, for example, be varied to vary the sensitivity of the detector 60, where the detector 60 is measuring the voltage across the resistor 50. An increasing resistance with increase the change in voltage caused by a change in the third current, and will produce higher sensitivity.

In some, but not necessarily all, examples, the resistor 50 is thermally isolated from the temperature to be detected. In some examples, the resistor 50 is substantially insensitive to the detected temperature. In some examples, the resistance may be in the region of 100 kOhm or 1 MOhm.

In some, but not necessarily all, examples, the resistor 50 is a discrete component in the current path. In some but not necessarily all examples, the resistor 50 is the conductive interconnect (without a discrete resistor component) providing the current path which has a resistance, which may be small in some examples.

Figure 2:
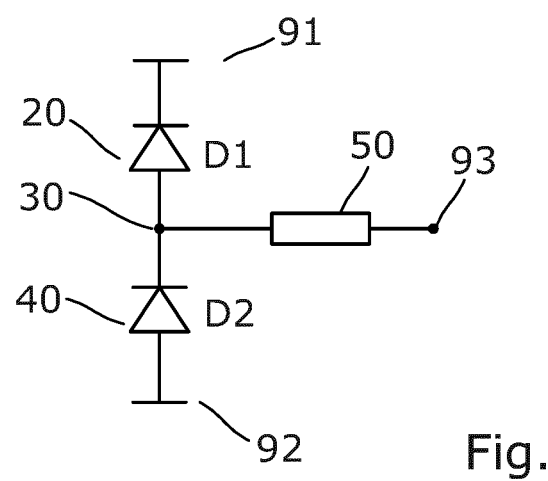
FIG. 2 shows another example embodiment of the subject matter described herein.

FIG. 2 illustrates a first embodiment. This embodiment is an example of the temperature-detecting apparatus 10 illustrated in FIG. 1. In this example, both the first current reference 20 and the second current reference 40 are reverse bias configured diodes D1, D2. Consequently, both the first current reference 20 and the second current reference 40 are temperature-dependent current references.

A temperature difference between the first current reference 20 and the second current reference 40 will therefore result in different saturation currents through the series connected diodes D1, D2. It will therefore be appreciated that a change in the temperature at either the first current reference 20, or a change in temperature at the second current reference 40 or a change in the temperature difference between the first current reference 20 and the second current reference 40 will result in a change in the third current $I_3$ which can be detected by the detector 60.

The saturation current for a diode is generated by thermal generation and diffusion of minority carriers and increases with increasing temperature. This increase can be calibrated for the apparatus 10.

In the example illustrated, the first current reference 20 is located at a first location and the second current reference 40 is located at a second different location. The third current $I_3$ is dependent upon a difference between a first temperature at the first location and a second temperature at the second location.

In some, but not necessarily all, examples, the reverse bias configured diodes D1, D2 have the same operating characteristics. This means that for the same temperature, they have the same saturation current. As a consequence, when the temperature of the first current reference 20 (diode D1) is the same as the temperature of the second current reference 40 (diode D2), the third current $I_3$ is zero. This can increase the dynamic range of the detector 60 as the operating point of zero current is a zero temperature-difference.

Figure 3C:
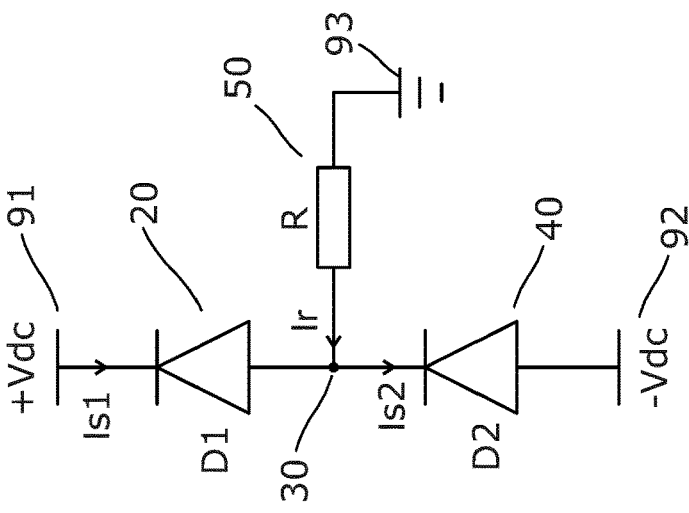
FIGS. 3A, 3B, 3C shows another example embodiment of the subject matter described herein.
Figure 3B:
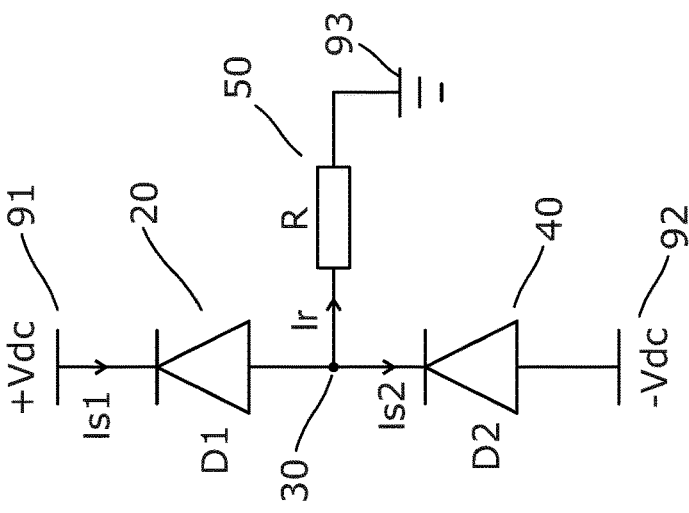
Figure 3A:
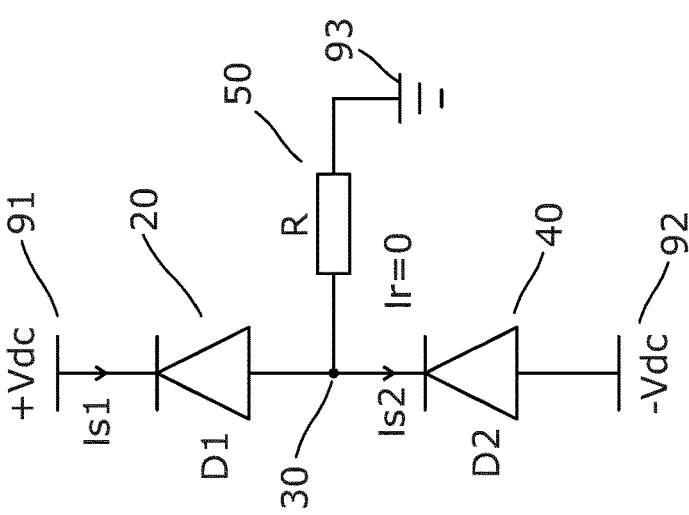

FIGS. 3A, 3B, 3C illustrate an example in which the temperature of the first reverse bias configured diode D1 of the first current reference 20 is at a temperature $T_1$ and the second reverse bias configured diode D2 of the second current reference 40 is at a temperature $T_2$.

In the example of FIG. 3A, the first temperature $T_1$ is the same as the second temperature $T_2$. The saturation current $I_{s1}$ through the first current reference 20 (reverse biased diode D1) is the same as the saturation current $I_{s2}$ through the second current reference 40 (reverse biased diode D2). As a consequence, the current $I_r$ through the resistor 50 is zero.

In the example of FIG. 3B, the first temperature $T_1$ is the greater than the second temperature $T_2$. The saturation current $I_{s1}$ through the first current reference 20 (reverse biased diode D1) is greater than the saturation current $I_{s2}$ through the second current reference 40 (reverse biased diode D2). As a consequence, the current $I_r$ through the resistor 50 is non-zero and away from the intermediate node 30.

In the example of FIG. 3C, the first temperature $T_1$ is the less than the second temperature $T_2$. The saturation current $I_{s1}$ through the first current reference 20 (reverse biased diode D1) is less than the saturation current $I_{s2}$ through the second current reference 40 (reverse biased diode D2). As a consequence, the current $I_r$ through the resistor 50 is non-zero and towards the intermediate node 30.

Figure 4:
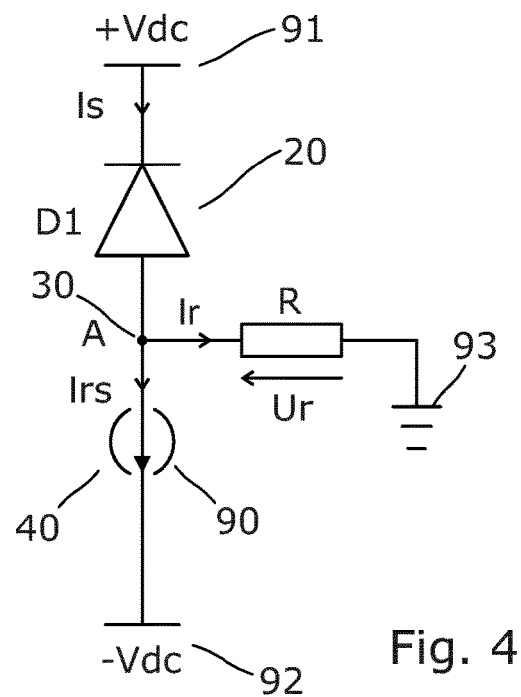
FIG. 4 shows another example embodiment of the subject matter described herein.

FIG. 4 illustrates an example of a second embodiment. This is another example of the temperature-detecting apparatus 10 illustrated in FIG. 1.

This embodiment is similar to the first embodiment, in that a reverse bias configured diode D1 is used as the first current reference 20. However, in this example, a constant current source 90 is used as the second current reference 40. Although in this example, the first current reference 20 is the reverse bias diode D1 and the second current reference 40 is a constant current source 90, in other examples the first current reference 20 can be a constant current source 90 and the second current source 40 can be a reverse bias configured diode.

It will therefore be appreciated that one of the first current reference 20 and the second current reference 40 has a constant current whereas the other is a reverse bias diode that has a saturation current that varies with temperature.

In this example the constant current source 90 provides a temperature-independent (and voltage-independent) constant current, whereas the reverse bias diode provides a temperature-dependent (and voltage-independent) current. The apparatus 10 is therefore configured to detect or measure a change in the temperature at the reverse bias diode over time. In this embodiment, only one of the first current reference 20 and the second current reference 40 is a temperature-dependent current reference.

Referring back to the example illustrated in FIGS. 1, 2, 3A, 3B, 3C and 4 it will be appreciated that the first current reference 20 is electrically connected between a first node 91 and the intermediate node 30 and that the second current reference 40 is electrically connected between a second node 92 and the intermediate node 30. The resistor 50 is electrically connected between a third node 93 and the intermediate node 30. As illustrated in FIG. 1, the apparatus 10 may optionally comprise a voltage controller 94 configured to control voltages applied to one or more of the first node 91, the second node 92 or the third node 93. Controlling the voltages at the first node 91, the second node 92 and the third node 93 can be used to control an operating point and range on the I-V characteristic of the reverse bias diode(s) used. For example, the value of the voltage at the third node 93 is set and fixed so that a given voltage at the first node 91 and a given voltage at the second node 92 produces a third current $I_3$ that is zero for a "normal" (most likely) temperature (or temperature difference).

Figure 5:
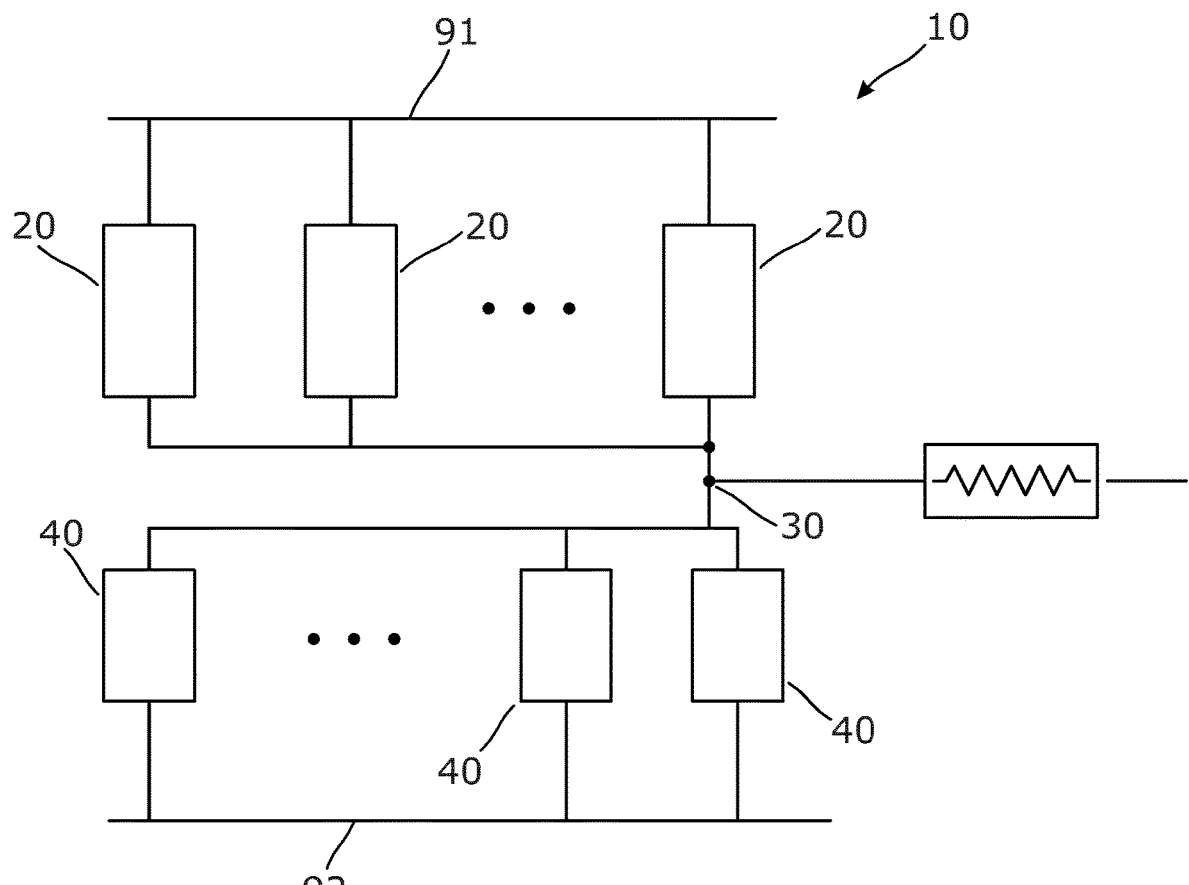
FIG. 5 shows another example embodiment of the subject matter described herein.

FIG. 5 illustrates an example of the apparatus 10 where the current reference 20, 40 that is temperature-dependent is replaced with multiple current references 20, 40 that are temperature-dependent and are arranged in electrical parallel. This results in the current change that arises in any one of the multiple current references 20, 40 being summed to produce a cumulative current change at the intermediate node 30.

In the example illustrated, the first current reference 20 is temperature-dependent. Multiple first current references 20 are arranged in electrical parallel. The first current references 20 are interconnected between the first node 91 and the intermediate node 30 in electrical parallel.

Also, in this example, but not necessarily all examples, the second current reference 40 is temperature-dependent. In the example illustrated, the second current reference 40 is temperature-dependent. Multiple second current references 40 are arranged in electrical parallel. The second current references 40 are interconnected between the second node 92 and the intermediate node 30 in electrical parallel.

It will be appreciated that in the foregoing examples, a forward biased diode is not used or is not required to be used.

Figure 6:
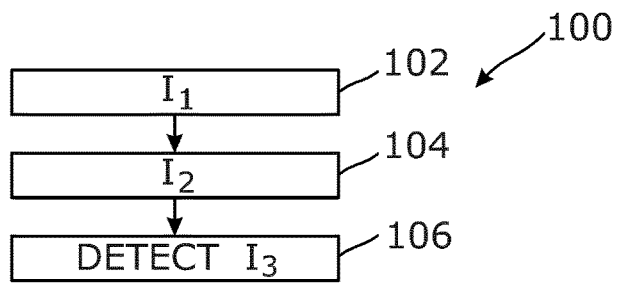
FIG. 6 shows another example embodiment of the subject matter described herein.

FIG. 6 illustrates a temperature-detecting method 100 comprising:
  at block 102, providing a first current $I_1$ to an intermediate node 30; and
  at block 104 drawing a second current $I_2$ from the intermediate node 30; wherein at least one of the first current $I_1$ and the second current $I_2$ is temperature-dependent; and
  at block 106, detecting a temperature comprising detecting a third current $I_3$ flowing to or from the intermediate node 30.

As will be appreciated from the foregoing examples, the first current $I_1$ can be provided by reverse biasing a diode D1 at a first temperature and drawing the second current $I_2$ by reverse biasing another diode D2 at a second temperature, and detecting the third current $I_3$ to detect a temperature difference between the first temperature and the second temperature.

It will also be appreciated from the foregoing that the first current $I_1$ may be provided by reverse biasing a diode D1 at a first temperature and drawing the second current $I_2$ by using a constant current source, and detecting the third current $I_3$ to detect the first temperature.

Figure 7:
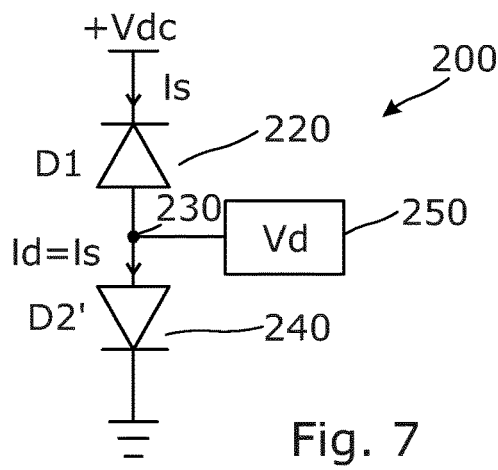
FIG. 7 shows another example embodiment of the subject matter described herein.

FIG. 7 illustrates an example of a temperature-detecting apparatus 200 comprising a first current reference 220 for providing a current to a serially-connected first temperature-dependent transconductance device 240 via a first intermediate node 230.

The apparatus 200 also comprises a detector 250 configured to detect a voltage at the first intermediate node 230 to detect a temperature of the first temperature-dependent transconductance device 240.

In this example, the first current reference 220 and the first temperature-dependent transconductance device 240 are back-to-back diodes D1, D2'. The first current reference 220 is a reverse bias configured diode D1 and the first temperature-dependent transconductance device 240 is a forward bias configured diode D2'.

In the example illustrated the first temperature-dependent transconductance device 240 is a forward bias configured diode D2' and the electric current through the first temperature-dependent transconductance device 240 is the forward bias current of the diode D2', whereas the current through the reverse bias configured diode 220 is the saturation current. It will be appreciated from the foregoing description of the Shockley diode equation that the voltage-current characteristic of a diode is significantly different in the forward bias regime compared to the reverse bias regime and, in particular, the temperature-dependency of the forward bias current and the reverse bias current are different.

As the forward bias diode 240 and the reverse bias diode 220 are in serial connection and because no current is drawn from the intermediate node 230, the current that passes through the forward bias diode D2' must also pass through the reverse bias diode D1. As a consequence, the voltage at the intermediate node 230 will adjust such that the forward bias current through the forward bias diode D2' equals the saturation current passing through the reverse bias diode D1.

The diodes D1 and D2' can be the same diodes (have the same voltage-current characteristic). In this case, the voltage Vi at the intermediate node 230 is linearly dependent on the temperature of the diodes D1 and D2'.

The voltage detector 250 can be configured to detect, at the intermediate node 230, an existence of a voltage, a plurality of the voltage, a magnitude of the voltage or a change in any of those parameters.

Figure 8:
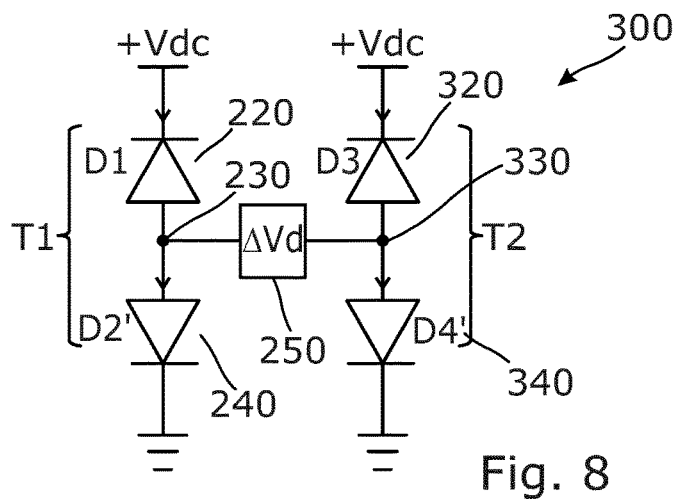
FIG. 8 shows another example embodiment of the subject matter described herein.

FIG. 8 illustrates an adaptation to the apparatus 200 illustrated in FIG. 7. The apparatus 200 additionally comprises a second current reference 320 for providing a current to a serially connected second temperature-dependent transconductance device 340 via a second intermediate node 330. In this example, the detector 250 is configured to detect a voltage at the second intermediate node 330 and detect a temperature of a second temperature-dependent transconductance device 340 or a temperature difference between the first temperature-dependent transconductance device and the second temperature-dependent transconductance device 340.

In this example, the second current reference 320 and the second temperature-dependent transconductance device 340 are back-to-back diodes and the second current reference 320 is a reverse bias configured diode D3 and the second temperature-dependent transconductance device 340 is a forward bias configured diode D4'.

It will therefore be appreciated that the operation of the second current reference 320 and the second temperature-dependent transconductance device 340 is the same as described in relation to the first current reference 220 and the first temperature-dependent transconductance device 240.

In the example illustrated, the first current reference 220 and the first temperature-dependent transconductance device 240 are at a first temperature T1 and the second current reference 320 and the second temperature-dependent transconductance device 340 are at a second temperature T2. The voltage detector 250 measures the voltage difference between a voltage at the first intermediate node 230 and a voltage at the second intermediate node 330.

In some examples, the first current reference 220 and the second current reference 320 have the same voltage-current characteristics, that is, the diodes D1, D3 have the same reverse bias current-voltage characteristics. The diodes D1, D3 can be the same.

In some examples, the first temperature-dependent transconductance device 240 and the second temperature-dependent transconductance device 340 have the same voltage-current characteristic, that is, the diodes D2', D4' have the same forward bias current-voltage characteristics. The diodes D2', D4' can be the same.

The diodes D1 and D2' can be the same diodes (have the same voltage-current characteristic). In this case, the voltage Vi at the intermediate node 230 is linearly dependent on the temperature of the diodes D1 and D2'.

The diodes D3 and D4' can be the same diodes (have the same voltage-current characteristic). In this case, the voltage Vi at the intermediate node 330 is linearly dependent on the temperature of the diodes D3 and D4'.

It will be appreciated that when the voltage-current characteristics of the components that affect the voltage at the intermediate node 230 and the voltage at the intermediate node 330 have the same characteristics, then the voltage difference between the first intermediate node 230 and the second intermediate node 330 will be zero when the first temperature is the same as the second temperature.

In some, but not necessarily all, examples, the apparatus 200, 300 also comprises a temperature detector (not illustrated). The temperature detector is coupled to the voltage detector 250 that detects the voltage at the intermediate node 230. The temperature detector is configured to convert detection of the voltage at the intermediate node 230 to detection of a temperature. The temperature detector can be configured to convert measurement of the voltage at the intermediate node 230 to measurement of a temperature. As previously described, the temperature detected may be an absolute temperature or may be a temperature difference.

Figure 9:
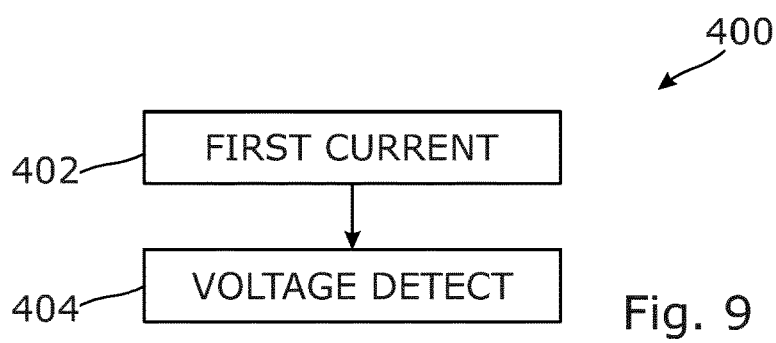
FIG. 9 shows another example embodiment of the subject matter described herein.

FIG. 9 illustrates an example of a temperature-detecting method 400 comprising:

at block 402, providing a first current to a serially-connected first temperature-dependent transconductance device via a first intermediate node 230; and at block 404 detecting a voltage at the first intermediate node 230 to detect a temperature of the first temperature-dependent transconductance device. In this method, the first current reference 220 and the first temperature-dependent transconductance device 240 are back-to-back diodes D1, D2' and the first current reference is a reverse bias diode D1 and the first temperature-dependent transconductance device is a forward bias diode D2'.

It should be appreciated from the foregoing description of the temperature-detecting apparatus 300, that the temperature-detecting apparatus 300 comprises:

a first current reference 220 for providing a current to a serially-connected first temperature-dependent transconductance device 240 via a first intermediate node 230;

a second current reference 320 for providing a current to a serially-connected second temperature-dependent transconductance device 340 via a second intermediate node 330; and a detector 250 configured to detect a voltage between the first intermediate node 230 and the second intermediate node 330 to detect a temperature difference between the first temperature-dependent transconductance device 240 and the second temperature-dependent transconductance device 340.

Such a temperature-detecting apparatus 300 can be used in a temperature-detecting method comprising:

providing a first current to a serially-connected first temperature-dependent transconductance device 240 via a first intermediate node 230;

providing a second current to a serially-connected second temperature-dependent transconductance device 340 via a second intermediate node 330; and detecting a voltage between the first intermediate node 230 and the second intermediate node 330 to detect a temperature difference between the first temperature-dependent transconductance device 240 and the second temperature-dependent transconductance device 340.

The temperature-detecting apparatus 10, 200, 300 may be used in various different applications. It may, for example, be used in air conditioning applications, device protection applications, consumer electronics, healthcare, etc. They may be used to detect a change in temperature over time or a change in temperature over space or a change in temperature over time and space.

Figure 10A:
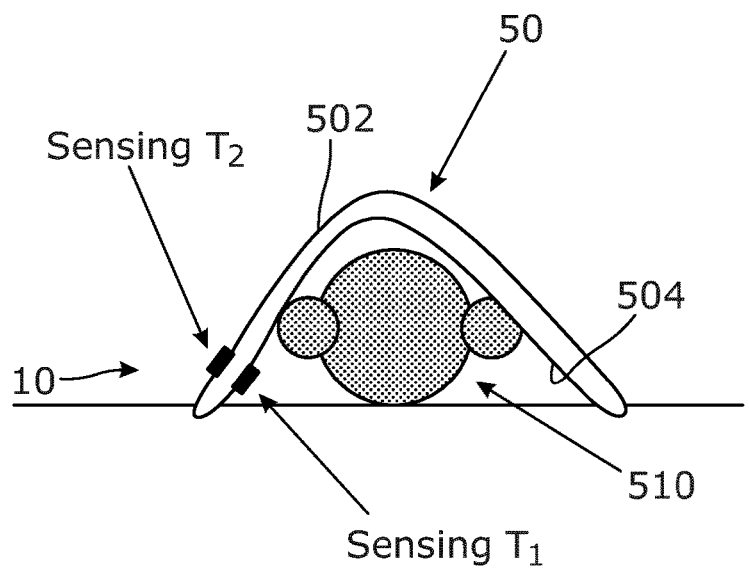
FIGS. 10A, 10B shows another example embodiment of the subject matter described herein.
Figure 10B:
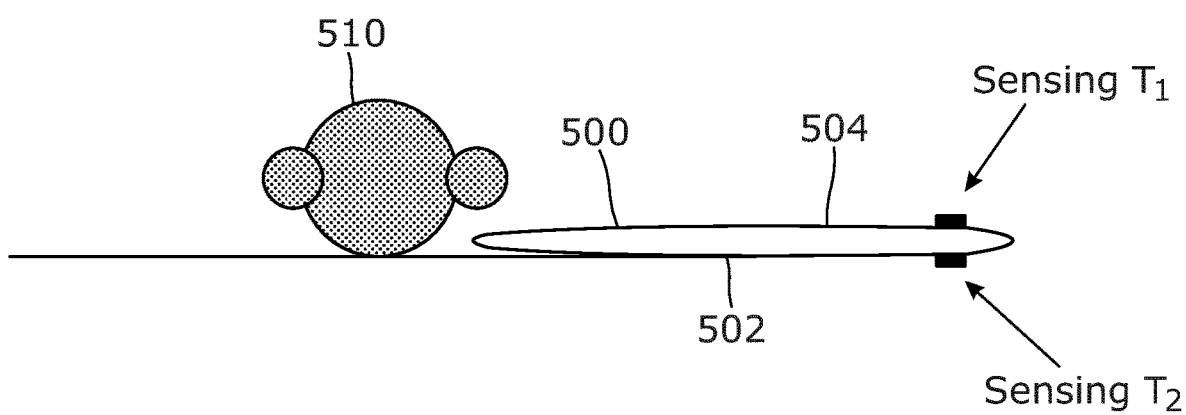

In one example, as illustrated in FIGS. 10A and 10B, the temperature-detecting apparatus 10 (or apparatus 200, 300) is integrated within a blanket 500. The temperature-detecting apparatus 100, 200, 300 is configured to detect a difference in temperatures between one side 502 of a blanket 500 and another side 504 of the blanket 500. When the blanket 500 covers a child 510, as illustrated in FIG. 10A, there is a temperature difference between the two sides 502, 504 of the blanket 500. However, when the child throws off the blanket as shown in FIG. 10B, the temperature differences between the two sides 502, 504 of the blanket 500 is different. This change in temperature either in relation to a single temperature sensor or in relation to the difference in temperature between the two sensors can be used to generate an alert warning to a parent that the child has thrown off their blanket 500.

Using the apparatus 10, the first current reference 20 operates as one sensor and the second current reference 40 acts as the other sensor.

Using the apparatus 200, the first current reference 220 operates as one sensor and the first temperature-dependent transconductance device 240 acts as the other sensor.

Using the apparatus 300, the first current reference 220 and/or the second current reference 240 operates as one sensor and the first temperature-dependent transconductance device 320 and/or the second temperature-dependent transconductance device 340acts as the other sensor.

Other applications may use temperature difference detection to detect when contact between the temperature-detecting apparatus and a person or animal has been lost. For example, it may be used to make sure that a worn item (e.g. watch or other device) is properly attached to a person or that a diving suit has not been compromised with a tear.

The various components described may be operationally coupled and any number or combination of intervening elements can exist (including no intervening elements).

One or more circuits can be used for performing the function of the one or more detectors 60, 70, 250 and/or controller 94.

Where a structural feature (e.g. detector 60, 70, 250 or controller 94) has been described, it may be replaced by means for performing one or more of the functions of the structural feature whether that function or those functions are explicitly or implicitly described.

The detector 60 performs the function of detecting the third current and may be replaced by any suitable detecting means. It may, for example, be an ammeter or voltmeter. It may for example be a Hall sensor which transforms magnetic field generated by current into a voltage.

The detector 70 performs the function of converting a detected third current to a temperature and may be replaced by any suitable temperature detecting means. It may, for example, be a comparator for measuring a current value with a reference value. Comparators may be implemented using operational amplifiers or in digital logic for example.

The controller 94 performs the function of controlling one or more voltages and may be replaced by any suitable voltage controller means. The controller 94 may be any suitable controller circuitry. It may be an ASIC or a programmed computer for example, or it may be specifically designed circuits.

In some but not necessarily all examples, the apparatus 10, 200, 300 is configured to be part of the Internet of Things forming part of a larger, distributed network.

The temperature detection may be for the purpose of health monitoring, data aggregation, patient monitoring, vital signs monitoring or other purposes.

The temperature detection data may be processed. The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 10, 200, 300 where it may produce an output sensible to the subject such as an audio output, visual output or haptic output.

As used here 'module' refers to a unit or apparatus that excludes certain parts/components that would be added by an end manufacturer or a user.

Referring to FIG. 1, one or more of the detector 60, detector 70 or controller 94 can be provided as a module separate to the apparatus 10 comprising the temperature dependent current reference.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A temperature detecting apparatus, comprising:
a first current reference configured to provide a current to a serially connected first temperature dependent transconductance device via a first intermediate node;
a second current reference configured to provide a current to a serially connected second temperature dependent transconductance device via a second intermediate node;
a detector configured to detect a voltage between the first and second intermediate nodes to detect a temperature difference between the first temperature dependent transconductance device and the second temperature dependent transconductance device, wherein the detector is configured to detect one or more of an existence of the voltage, a polarity of the voltage, and a magnitude of the voltage, and wherein the first current reference is a temperature dependent reverse bias configured diode configured to provide a first temperature dependent current; and
a temperature detector configured to convert the detected voltage between the first and second intermediate nodes to an indication of the temperature difference,
wherein a variable magnitude of a reverse saturation current of the first current reference increases with temperature,
wherein the second current reference is a temperature dependent reverse bias configured diode configured to provide a second temperature dependent current,
wherein the temperature dependent reverse bias configured diode of at least one of the first current reference and the second current reference is substantially voltage independent within an operational voltage range,
wherein the first current reference and the second current reference have the same voltage-current characteristic,
wherein the first temperature dependent transconductance device and the second temperature dependent transconductance device have the same voltage-current characteristic,
wherein the first temperature dependent transconductance device is a forward bias configured diode, and the second temperature dependent transconductance device is a forward bias configured diode, and
wherein the first current reference and the first temperature dependent transconductance device are back to back diodes and wherein the second current reference and the second temperature dependent transconductance device are back to back diodes.

2. A temperature detecting method, comprising:
providing a first current to a serially connected first temperature dependent transconductance device via a first intermediate node;
providing a second current to a serially connected second temperature dependent transconductance device via a second intermediate node;
detecting a voltage between the first and second intermediate nodes to detect a temperature difference between the first temperature dependent transconductance device and the second temperature dependent transconductance device;
using a reverse biased diode to provide the first current and another reverse biased diode to provide the second current; and
converting the detected voltage between the first and second intermediate nodes to an indication of the temperature difference,
wherein a temperature dependent reverse bias configured diode of at least one of a first current reference and a second current reference is substantially voltage independent within an operational voltage range,
wherein the first current reference and the second current reference respectively provide the first current and the second current,
wherein a variable magnitude of a reverse saturation current of the first current reference increases with temperature, and
wherein the first temperature dependent transconductance device is a forward biased diode.

3. A temperature detecting apparatus, comprising:
a first current reference configured to provide a current to a serially connected first temperature dependent transconductance device via a first intermediate node;
a detector configured to detect a voltage at the first intermediate node to detect a temperature of the first temperature dependent transconductance device, and to detect one or more of an existence of the voltage, a polarity of the voltage, and a magnitude of the voltage; and
a temperature detector configured to convert the detected voltage at the first intermediate node to an indication of the temperature of the first temperature dependent transconductance device,
wherein a variable magnitude of a reverse saturation current of the first current reference increases with temperature, wherein the first current reference and the first temperature dependent transconductance device are back to back diodes, and wherein the first current reference is a reverse bias configured diode and the first temperature dependent transconductance device is a forward bias configured diode, said apparatus further comprising:

a second current reference for providing a current to a serially connected second temperature dependent transconductance device via a second intermediate node, wherein the detector is also configured to detect a voltage at the second intermediate node to detect a temperature of the second temperature dependent transconductance device or a temperature difference between the first temperature dependent transconductance device and the second temperature dependent transconductance device, wherein the temperature detector is configured to convert the voltage at the second intermediate node to a temperature of the second temperature dependent transconductance device or convert a voltage difference between the voltage at the first intermediate node and the voltage at the second intermediate node to an indication of the temperature difference between the first temperature dependent transconductance device and the second dependent transconductance device, wherein the second current reference and the second temperature dependent transconductance device are back to back diodes, wherein the second current reference is a reverse bias configured diode and the second temperature dependent transconductance device is a forward bias configured diode, wherein the reverse bias configured diode of at least one of the first current reference and the second current reference is substantially voltage independent within an operational voltage range, wherein the first current reference and the second current reference have a same voltage-current characteristic, and wherein the first temperature dependent transconductance device and the second temperature dependent transconductance device have a same voltage-current characteristic.

4. A temperature detecting method, comprising:

providing a first current to a serially connected first temperature dependent transconductance device via a first intermediate node;

detecting a voltage at the first intermediate node to detect a temperature of the first temperature dependent transconductance device; and converting the detected voltage to an indication of the temperature, wherein a variable magnitude of a reverse saturation current of a first current reference increases with temperature, wherein the first current reference and the first temperature dependent transconductance device are back to back diodes, wherein the first current reference provides the first current, wherein the first current reference is a reverse biased diode and the first temperature dependent transconductance device is a forward biased diode, and wherein the reverse biased diode is substantially voltage independent within an operational voltage range.

* * * * *